(12) United States Patent
King

(10) Patent No.: US 12,043,415 B2
(45) Date of Patent: Jul. 23, 2024

(54) AUTONOMOUS MULTI-USE SUBTERRANEAN AIRCRAFT PULL-THROUGH SYSTEM AND METHOD OF USE

(71) Applicant: Raymond King, Miami, FL (US)

(72) Inventor: Raymond King, Miami, FL (US)

( * ) Notice: Subject to any disclaimer, the term of this patent is extended or adjusted under 35 U.S.C. 154(b) by 119 days.

(21) Appl. No.: 18/076,998

(22) Filed: Dec. 7, 2022

(65) Prior Publication Data

US 2023/0227176 A1 Jul. 20, 2023

Related U.S. Application Data

(60) Provisional application No. 63/286,822, filed on Dec. 7, 2021.

(51) Int. Cl.
*B64F 1/223* (2024.01)
*B61B 5/02* (2006.01)

(52) U.S. Cl.
CPC .............. *B64F 1/223* (2024.01); *B61B 5/025* (2013.01)

(58) Field of Classification Search
CPC .. B64F 1/223; B64F 1/22; B64F 1/224; B64F 1/225; B64F 1/228; B61B 5/025; G08G 5/0026; G08G 5/0043; G08G 5/065
See application file for complete search history.

(56) References Cited

PUBLICATIONS

ATS, Aircraft Towing Systems, May 7, 2021, ATS, All pages (Year: 2021).*

* cited by examiner

*Primary Examiner* — Valentina Xavier
(74) *Attorney, Agent, or Firm* — Kaustubh Nadkarni; Nadkarni Law PLLC

(57) ABSTRACT

The present invention relates to an autonomous, multi-use, subterranean aircraft pull-through system that connects with an aircraft arriving at the ramp pick-up point and transits through the terminal building, in a unidirectional movement, where the aircraft is serviced, then disconnects from the aircraft at the ramp release point. The autonomous, subterranean aircraft pull-through system receives multiple aircraft in a row, with rows adjacent to each other, where aircraft are nose to tail, and side by side, occupying the smallest footprint in the industry. The autonomous, subterranean aircraft pull-through system is remotely controlled and operates autonomously in a subterranean manner to assist in servicing the aircraft. The system helps to speed up the aircraft handling component of airside operations, improve safety, reduce emissions, and the cost factors borne by both airports and airlines. The autonomous, subterranean aircraft pull-through system design is versatile in handling all code A-F (ICAO) aircraft.

20 Claims, 10 Drawing Sheets

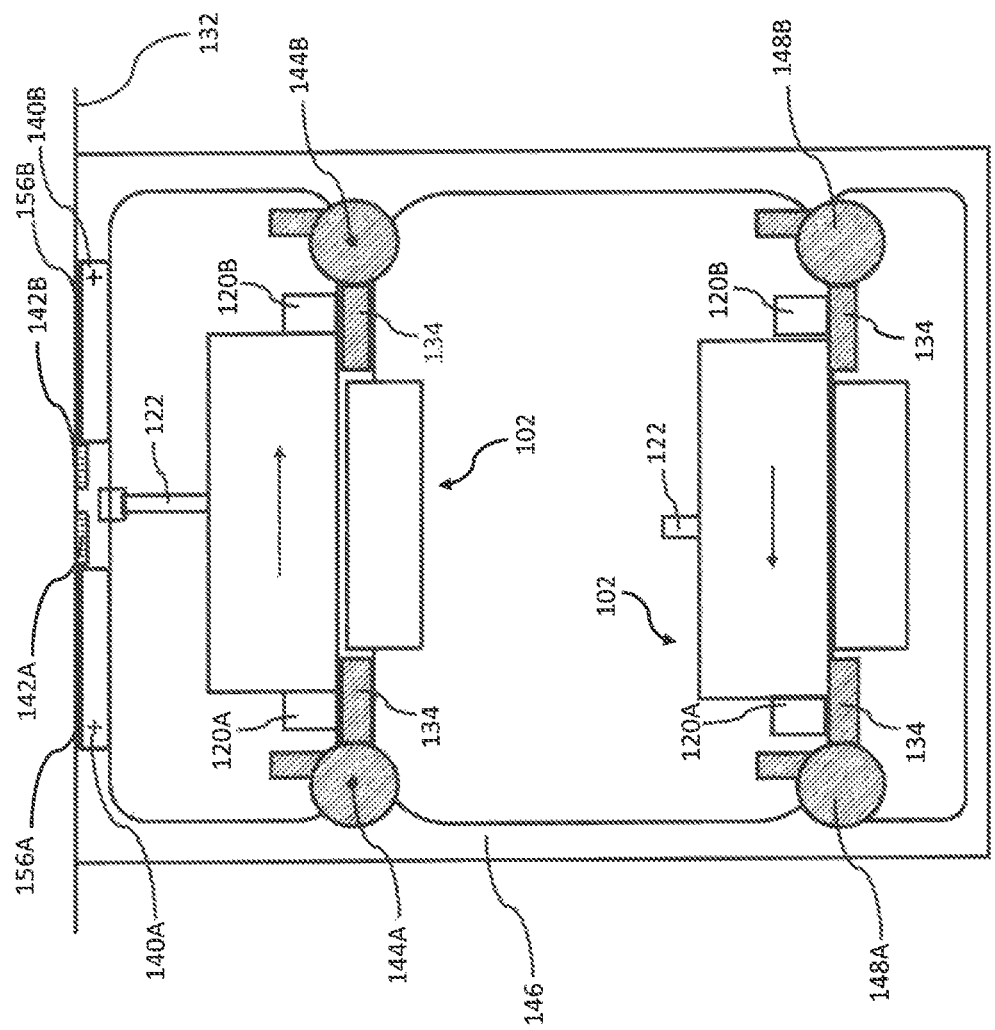

AUTONOMOUS MULTI-USE SUBTERRANEAN AIRCRAFT PULL-THROUGH SYSTEM AND METHOD OF USE

CROSS-REFERENCE TO RELATED APPLICATIONS

This Non-Provisional application claims priority from the Provisional Application Ser. No. 63/286,822.

FIELD OF THE INVENTION

This invention generally relates to aircraft pull-through systems. More specifically, an autonomous, multi-use, aircraft pull-through system operating in a subterranean environment allows the airport terminal operations with a quicker, cost-effective, and energy-efficient means of transiting an aircraft and the method of using the system.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

With the accelerating demand of achieving a quarter of a billion additional passengers a year worldwide, the airline industry is in a dire predicament regarding how to handle the astronomical growth of passengers using the airport infrastructure. An entirely new or refurbished legacy airport may require significant investment, lengthy build-out times, and numerous bureaucratic agency and government approvals. This is further exacerbated by environmental groups, who are likely to demand far more energy-efficient airport facilities. Essentially, the building of a new airport and its corresponding terminals takes a lot of work, courage, and approvals. Legacy airports have done a marvelous job getting the industry to 4.54 billion passengers annually (2019). However, in doing so, many have equaled or exceeded their design capacity to achieve some of these major milestones.

In addition to the business reasons to expand infrastructure, there are systemic issues related to legacy airports. For instance, current demands require a change to meet the forecast growth of 8 billion passengers a year by 2035 (IATA). Well-known industry challenges include limited slot (gate) capacity, ground congestion, site restricted by regulation or available land, ramp damage to the airport terminal and the aircraft, ground staff injuries, environmental pollution concerning noise (footprint), and environment (zero-carbon), access to mandated rail connection, soaring labor costs, curfew hours, and slow investment in digitalization and robotics. A review of the challenges suggests that a band-aid approach to airport infrastructure improvements may inhibit the aviation industry from achieving its market potential on time or within budgetary constraints. To that end, it is evident that a need exists in the market for an invention that can resolve many of the aviation industry's challenges.

To fulfill this need in the market, one such invention is disclosed in the prior art as a buried type automatic aircraft traction system and traction method (CN. Pub. No. CN105151312A). The prior art shows a partially subterranean arrangement to pull aircraft into the gate area, as well as pull an aircraft back from the gate and align it ready for taxiing to the runway, during which time the aircraft turns twice through 90 degrees. The carriage portion shows the nose wheel assembly is coupled to a carrier assembly above the ground with a turntable feature, supported on a column that allows the nose wheel to be turned during arriving and departure movements. Motion for movement of the aircraft is provided by a drive motor and cable winch system using a cable and drum method powered by two electric winches to move the aircraft along at ground level just above an underground passage. The motive force is provided by a linear motor anchored to the ground and connected to the electric winches whose cable is connected to the carrier frame.

The traction method claims to reduce investment and operation costs, increase flow and labor efficiency, guarantee the timeliness, and reduce safety risks. The angled, nose-in of aircraft at the apron area would increase the separation distance between aircraft, and so would need a larger ramp area, compared to the right-angled, nose-in approach used today. Angled nose-in is often used where traffic is light, thus limiting its use to regional airport operations. This pull-in and push-back system will stress the nose wheel assembly, compared to today's automated straight docking systems. The system offers a push-back operation that would replace today's legacy push-back systems. The system would take one vehicle off the ramp area. The claim of reduced operating costs is difficult to understand since many aircraft dock directly to the ramp today to save a pull-in operation.

There is another invention disclosed in the prior art as improvements to aircraft taxiing (US. Pub. No. US 20190202579A1). Although this invention is under the subterranean category all the aircraft handling activity is above ground, showing a typical aircraft tug moving an aircraft between the taxiway and terminal. The actual subterranean part is the inductive strip used to power the tug along a predefined taxiway and to assist in positioning a tug in that taxiway. Also, to avoid tugs being held back from use due to active taxiing by other tugs, there are subterranean sections to allow tugs only to pass each other in the apron area. This invention details the remote control and autonomous operation of the system used to position aircraft at the terminal efficiently, some of which may be lost due to the lack of availability of tugs, and compromised apron space.

There is yet another invention disclosed in the prior art as a system of driving channels for a carriage for transporting airplanes on an airport apron (EP. Pub. No. EP3168161A1). This prior art covers a subterranean arrangement for pulling aircraft from a taxiway to an airport terminal building and returning them to a taxiway area, a process largely carried out today autonomously by the aircraft itself, and a towing vehicle where gate areas are crowded, with aircraft and ramp vehicles. This invention has a towing system that moves linearly on a horizontal plane to deliver and return aircraft to a fixed location. The towing system shuttles back and forth on multiple fixed tracks. This invention requires the digging up of apron areas to site the various channels needed for the basket and carrier to connect the aircraft to a towing system. By delegating the required channels to particular gates, it would create delays to other aircraft wishing to taxi away from the terminal, as aircraft move bi-directionally today on the apron area. This invention outlines all activities carried out in prevailing weather conditions, which would impact the efficiency and sustainability of equipment, motor drives, sliding covers, and portable gratings. This invention necessitates the towing function to move in a series of right-angle maneuvers to tow the aircraft across the ramp area to the designated gate. This invention shows the towing function requires a push-back feature to move the aircraft off the gate, while again moving in right angle turns across the apron area to a taxiing position. This invention's scope of operation may well depend upon the number of channels that can be cut in the airport's apron area, multiplied by the frequency that can be achieved without aircraft being in each other's way. With an industry forecast to double in size by 2030, a finite apron space will define the operational aspect of the design. The smallest delay in coupling to an aircraft will impact all schedules.

Yet another invention is disclosed in the prior art as an automated system for maneuvering aircraft on the ground (E.P. Pub. No. EP2303697A2). The prior art describes a driverless towing vehicle, on the ground, with an automated system for connecting to the chassis of an aircraft, to maneuver it from landing to takeoff. It can autonomously connect to the aircraft at a prescribed landing site, and provide the steering, and braking to the aircraft to stop at a passenger boarding position, or an outboard position while saving fuel. During the servicing function for the aircraft, the AGTV (Automated Guided Towing Vehicle) releases from the aircraft and reconnects once the aircraft is cleared to be towed to a transfer area where engines can "spool up." A diagnostic unit provides status information on the AGTV's maintenance and refueling needs. Various electronics provide direction and collision avoidance with other vehicles and pedestrians. The drive system is diesel-electric or diesel-hydraulic, or if battery-powered, must be recharged or refueled.

Yet another invention is disclosed in the prior art as Aircraft Tug Vehicle (U.S. Pub. No. US20140048342A1). The prior art describes a base plate supported on two tracked assemblies, capable of engaging the nose wheel of an aircraft. Two drive motors each mounted on either side of the base plate provide direction to the vehicle. In lieu of a tow bar, rotation of the front rollers engages with the aircraft nose wheel assembly and clamps it to a base plate. Motion is obtained by a series of sprockets connected to a center rail, and a tread pad assembly engaged by the sprockets. As the motor drive rotates the sprockets, they engage with the tread pads arranged like a conveyor, so as the axle rotates it causes the track assembly to move forwards to link with the aircraft or backward to tow it. Linkage bars, connect the front and back ends of the tug, whereby when the rear roller is moved then the front roller rotates around the nose wheel assembly to connect the aircraft to the tug and to release it. The tug vehicle is remotely controlled, with directional capability, and operates at ground level.

Yet another invention is disclosed in the prior art as automated aircraft towing vehicle system (U.S. Pat. No. 6,305,484B1). This invention covers an aircraft being towed by a towing tractor which is moved by a remote system controller located in the aircraft. It can start, stop, and steer the vehicle, and has a decoupling feature. An alternative remote steering means may be from a guidance system mounted under a taxiway, or the edge of a taxiway along which the aircraft is being towed. The invention suggests that this alternative guidance system would work when the tow tractor returns to the terminal for its next use. In addition, the remote feature may be assigned to an operator who takes over the remote control of the towing tractor functions, in the event of an emergency. This invention does not involve the aircraft towing system operating in a subterranean manner. Only a guidance system cable is located below the taxiway's edge along which the aircraft is moving. The towing tractor remains above ground while providing movement to an aircraft. Industry experience has concluded that long distant towing causes extra wear and tear to the nose wheel assembly resulting in more frequent maintenance visits and costs.

Yet another invention is disclosed in the prior art as a system and method for parking and handling aircraft (NL. Pub. No. NL2009881C2). This prior art promotes the efficient parking and processing of aircraft at the airport terminal. The processing of the aircraft on a transport device takes a continuous form by using processing segments, a series of disks that engage with the nose wheel assembly to draw the aircraft towards the terminal, requiring a second, contra-rotating disk to complete the maneuver. The support structure holding the aircraft as it rotates around the terminal building can utilize either air-filled wheels, train wheels, liquid columns, air, or electromagnets. The center core of the terminal contains loading and unloading passenger bridges, processing segments for all cabin services, and ground services. All servicing occurs on the port side of the aircraft since it is the only part of the aircraft connecting to the terminal. There is a fixed support structure providing bearing support for the moving processing segments. The design shows satellite terminals linked by a partial roof covering, with only the port wing entering the terminal. The circular building requires taxing roads into and out of the terminal such that all aircraft turn 180 degrees during processing, thus reducing the gate space, due to the roads' separation.

Yet another invention is disclosed in the prior art as a system and method for transferring airplanes (U.S. Pub. No. US20080083851A1). The prior art describes a towbar-less tug system for use in towing aircraft to and from a terminal gate. The tug operates at ground level, and is remote-controlled, to manage speed, direction, and location in performing its towing tasks. Motion can be using wheels or caterpillar tracks to move the tug. This tug system is part of a family of tugs with particular features associated with pulling or pushing an aircraft to the airport terminal gate only.

Accordingly, it is apparent that a need exists for an aircraft towing system that can resolve many of the challenges of the existing systems and helps to generate efficient handling operations for the entire airport terminal, thus reducing the high operating costs. The present invention is directed towards addressing such dire needs for an airport terminal.

BRIEF SUMMARY OF THE INVENTION

According to the first aspect of the invention, an autonomous subterranean aircraft pull-through system (PTS) for use primarily to move multiple aircraft at a time through the airport terminal building and assist in servicing the aircraft is provided. The autonomous subterranean aircraft pull-through system includes a sled system. The sled system includes a sled assembly to provide a pulling force for the aircraft in a uni-directional, simultaneous, and linear movement. The sled assembly moves linearly during servicing of the aircraft, then cycles through a channel arrangement located below the ground floor of the airport terminal building in an endless loop to reconnect to the next aircraft to arrive at the desired location for servicing. A power drive system is provided for the sled assembly, and a tow bar system is anchored to the sled assembly at the first end. The second end of the tow bar system is designed to incorporate a plurality of adapters. The tow bar system extends to connect with the aircraft, utilizing one of its plurality of adapters and guided to the aircraft nose wheel coupling point of the aircraft by use of a sensor. The sled assembly includes a controller, a braking system, a positioning sensor, and a computer control system. The sled assembly is steerable by the power drive system and can be accelerated by the power drive system under the control of the controller and stopped by the braking system.

The computer control system is configured to communicate with the sled assembly. More specifically, the computer control system is configured to (i) control the acceleration and stopping of the sled assembly, (ii) automate coupling and decoupling of the aircraft nose wheel with the tow bar system, and (iii) indicate when the sled assembly starts and stops. After the sled assembly is accelerated so as to cause movement of the sled assembly and concomitant movement of the aircraft being pulled, the steering of the sled assembly is under the control of the computer control system for the sled assembly. The positioning sensor identifies the arriving aircraft and selects the appropriate tow bar adapter to attach to the aircraft to commence the pull-through operations. The sled assembly further includes a decoupling means for decoupling the sled assembly from the aircraft being pulled when the aircraft designated for servicing is completed.

In one of many preferred embodiments, the sled assembly is configured to pull the aircraft through multiple cells arranged in a row, where servicing of the aircraft takes place in preparation for its next flight and release. The pull-through system is provided in each cell of the row.

In another one of many preferred embodiments, the sled assembly moves on main rails with toothed racks where motion is provided through the engagement of toothed pinion gear wheels located at the front and rear of the sled assembly, and the main rails. with toothed racks located on either side of the sled assembly.

In yet another one of many preferred embodiments, a rail switching arrangement allows the sled assembly to travel on the main rails in an upright position during aircraft coupling and aircraft decoupling cycles. Horizontal and vertical switching of the toothed pinion gear wheels on the toothed rack main rails allows the sled assembly to maintain the upright position.

In yet other preferred embodiments, the channel arrangement includes (i) a channel structure for the length of the entire airport terminal building, (ii) fixed frames modules equally spaced along the length of the terminal, (iii) lower hinged sub-frames fastened to the channel structure located on the underside of the airport terminal ground level engaging the rotating toothed pinion gear wheels and the main rails, (iv) movable upper and lower frames comprising hinge points, and (v) larger and smaller hinged cover plates, the larger hinged cover plates are attached to the movable upper frame hinge points.

In yet one of many other preferred embodiments, an advancing sled assembly is configured to raise the tow bar system by releasing the smaller hinged cover plates to facilitate the engagement of the towbar system to the aircraft nose wheel.

In yet one of many preferred embodiments, the system further includes a remote controlling means that coordinates the pull-through sequences of the aircraft in real-time with ground control, air traffic control, support services, and ground staff using a wireless communication link at a distinct frequency.

According to the second aspect of the invention, an autonomous subterranean aircraft pull-through system for use primarily to move multiple aircraft at a time through the airport terminal building and assist in servicing the aircraft is provided. The autonomous subterranean aircraft pull-through system includes a sled system. The sled system includes a sled assembly to provide a pulling force for the aircraft in a uni-directional, simultaneous and linear movement through multiple cells arranged in a row, where servicing of the aircraft takes place in preparation for its next flight and release. The pull-through system is provided in each cell of the row. The sled assembly moves linearly during the servicing of an aircraft, then cycles through a channel arrangement located below the ground floor of the airport terminal building in an endless loop to reconnect to the next aircraft to arrive at the airport terminal entrance. A power drive system is provided for the sled assembly and a tow bar system is anchored to the sled assembly at the first end. The second end of the tow bar system is designed to incorporate a plurality of adapters. The tow bar system extends to connect with the aircraft, utilizing one of its plurality of adapters, guided to the aircraft nose wheel coupling point of the aircraft by use of a sensor. The sled assembly includes a controller, a braking system, a positioning sensor, and a computer control system. The sled system is steerable by the power drive system and is capable of being accelerated by the power drive system under the control of the controller and stopped by the braking system. The computer control system is configured to communicate with the sled assembly. More specifically, the computer control system is configured to (i) control acceleration and stopping of the sled assembly, (ii) automate coupling and decoupling of the aircraft nose wheel with the tow bar system, (iii) indicate when the sled assembly starts and stops, and (iv) engages with the aircraft's braking system throughout the process of transitioning the multiple cells. After the sled assembly is accelerated so as to cause movement of the sled assembly and concomitant movement of the aircraft being pulled, the steering of the sled assembly is under the control of the computer control system for the sled assembly. The positioning sensor identifies the arriving aircraft and selects the appropriate tow bar adapter to attach to the aircraft to commence the pull-through operations. The computer control system responds to positioning sensors in each row of cells. The sled assembly includes a decoupling means for decoupling the sled assembly from the aircraft being pulled when the aircraft designated for servicing in the cell is completed. The sled system moves subterranean on main rails through a sequence of switches, as it moves back to the arrival ramp position, to repeat the sequence for the next aircraft designated for servicing in the particular row of cells.

In another preferred embodiment, the sled assembly moves on the main rails provided with toothed racks where motion is provided through the engagement of toothed pinion gear wheels located at the front and rear of the sled assembly and the main rails with toothed racks located on either side of the sled assembly.

In yet another preferred embodiment, a rail switching arrangement allows the sled assembly to travel on the main rails in an upright position during aircraft coupling and aircraft decoupling cycles. Horizontal and vertical switching of the toothed pinion gear wheels on the toothed rack main rails allows the sled assembly to maintain the upright position.

In yet another preferred embodiment, the power drive system includes power drive motors and a power drive shaft connected to the main rails with toothed racks and toothed pinion gear wheels. The power drive system drives the power drive shaft through the power drive motors that turn the toothed pinion gear wheels engaging with toothed rack main rails, providing the sled assembly the necessary motive power to pull the aircraft along.

In yet another preferred embodiment, the power drive system is configured to handle varying sled assembly operating loads.

In yet another preferred embodiment, the adapter and the sensor facilitate locating and engaging the aircraft nose wheel with an optical device that locates the coupling point on the aircraft nose wheel.

In yet another preferred embodiment, each aircraft is assigned a sled assembly including the tow bar system that extends to connect with the aircraft with the plurality of adapters and retracts to stow into the sled assembly upon disconnection from the aircraft.

In yet another embodiment, the power drive system is positioned below the ground level and the adapter end of the towbar system is above the ground level.

In yet another preferred embodiment, the channel arrangement includes (i) a channel structure for the length of the entire airport terminal building, (ii) fixed frames modules equally spaced along the length of the terminal, (iii) lower hinged sub-frames fastened to the channel structure located on the underside of the airport terminal ground level engaging the sets of rotating toothed pinion gear wheels and the main rails, (iv) movable upper and lower frames comprising hinge points, and (v) larger and smaller hinged cover plates, the larger hinged plates are attached to the movable upper frame hinge points.

In yet another preferred embodiment, an advancing sled assembly is configured to raise the tow bar system by releasing the smaller hinged cover plates to facilitate the engagement of the towbar system to the aircraft nose wheel.

In yet another preferred embodiment, the system further includes a remote controlling means that coordinates the pull-through sequences of the aircraft in real-time with ground control, air traffic control, support services, and ground staff using a wireless communication link at a distinct frequency.

In yet another preferred embodiment, the sled assembly pulls the aircraft through a row of cells, with the aircraft positioned nose to tail, and side by side within the enclosed terminal.

According to another aspect of the present invention, a method of facilitating the moving of multiple aircraft at a time through the airport terminal building and assisting in servicing the aircraft is provided. The method includes coupling an aircraft to an autonomous subterranean aircraft pull-through system. The method includes pulling the aircraft by the sled assembly for servicing without starting the aircraft's engines. The method includes decoupling the sled assembly from the nose wheel of the aircraft by retracting the tow bar system into the sled assembly after the completion of servicing and clearing for taxiing to the runway. The method includes returning the sled assembly to an arrival ramp position, to repeat the sequence for the next aircraft designated for servicing. The use of the sled system reduces congestion of the aircraft at the ramp, and increases aircraft block hours, a measure of airline fleet efficiency.

According to another aspect of the present invention, the autonomous subterranean aircraft pull-through system includes a sled system. The sled system includes a sled assembly to provide a pulling force for the aircraft in a uni-directional, simultaneous, and linear movement. The sled assembly moves linearly during servicing of the aircraft, then cycles through a channel arrangement located below the ground floor of the airport terminal building in an endless loop to reconnect to the next aircraft to arrive at the desired location. A power drive system is provided for the sled assembly and a tow bar system is anchored to the sled assembly at the first end. The second end of the tow bar system is designed to incorporate a plurality of adapters. The tow bar system extends to connect with the aircraft, utilizing one of its plurality of adapters and guided to the aircraft nose wheel coupling point of the aircraft by use of a sensor. The sled assembly includes a controller, a braking system, a positioning sensor, and a computer control system. The sled assembly is steerable by the power drive system and capable of being accelerated by the power drive system under the control of the controller and stopped by the braking system. The computer control system is configured to communicate with the sled assembly. More specifically, the computer control system is configured to (i) control the acceleration and stopping of the sled assembly, (ii) automate coupling and decoupling of the aircraft nose wheel with the tow bar system, and (iii) indicate when the sled assembly starts and stops. After the sled assembly is accelerated so as to cause movement of the sled assembly and concomitant movement of the aircraft being pulled, the steering of the sled assembly is under the control of the computer control system for the sled assembly. The positioning sensor identifies the arriving aircraft and selects the appropriate tow bar adapter to attach to the aircraft to commence the pull-through operations. The sled assembly further includes a decoupling means for decoupling the sled assembly from the aircraft being pulled when the aircraft designated for servicing is completed The autonomous, subterranean aircraft pull-through system guides the aircraft into the airport terminal building by connecting it with the nose wheel assembly of the aircraft. The connection between the aircraft and the nose wheel assembly facilitates the aircraft's movement from the ramp area into a fully covered airport terminal building, where the aircraft is transiting or being serviced. The sled assembly carries the power drive system and the tow bar system, which respectively provide the motive force to pull the aircraft in a preferred or predetermined direction without the use of excessive effort or force to the nose wheel assembly. The sled assembly connects to the aircraft to provide motion and to give guidance to the aircraft as it transits through the airport terminal. Furthermore, the sled assembly runs on rails which provides a switching function to move the sled assembly from horizontal to vertical, and back to horizontal orientation like a conveyor system operation but keeping the sled assembly upright during its advancing and returning movement through a row of cells of the fully covered airport terminal. The sled assembly is also structured to handle the forces set up by the pulling action of the autonomous, subterranean aircraft pull-through system, namely the weight of the aircraft on the nose wheel assembly and the pulling forces exerted by the power drive system. The main rails with toothed tracks provide robustness to the pull-through system's sustainable operation. The power drive assembly with its electric motors powers the drive shaft that turns pinion gear wheels mounted on the tracks to engage with a rack gear machined over the entire length of the main rail tracks. Rotation of the pinion gear wheels meshing with a fixed rack causes the pinion wheels to move the sled assembly along the rack gear, giving motion to the entire sled assembly. The tow bar system of the autonomous, subterranean pull-through system can have a range of adapters structured to connect with various aircraft nose wheel assembly configurations, whereby a coupling device can select the appropriate adapter to connect autonomously with the aircraft. The autonomous connection with the aircraft can continue during the entire aircraft transiting process, but can also uncouple through a decoupling means when the aircraft is cleared for taxiing to the airport runway. The autonomous, subterranean aircraft pull-through system moves the aircraft in a linear arrangement or motion as the aircraft transits through the cells arranged in a row, in preparation for the aircraft's next scheduled flight. With multiple cells disposed in each row of the airport terminal, the autonomous, subterranean aircraft pull-through system is connected to each transiting aircraft in the airport terminal. To facilitate the transitioning of the aircraft within each row, the pull-through system can cease and start at each cell location, requiring the tow bar system to be connected to the aircraft's braking system during the aircraft's transit within the airport terminal.

The digital-based system controls the multiple sequences of events to handle a variety of aircraft during their respective transiting times. All pulling sequences will be digitally coordinated with the ground control, the air traffic control, all the support services, and the ground staff, in real time, with a communication link with the aircraft. Additionally, all the maintenance and repair capabilities are built into the autonomous, subterranean aircraft pull-through system to support its continuous operations within the airport terminal building. Moreover, the autonomous, subterranean aircraft pull-through system provides for total sustainability of the airport terminal's handling capability and its installed equipment. The additional feature that differentiates the pull-through system from its predecessor legacy towing system is the ability to maintain or replace. This feature ensures that the airport's pulling facility is not interrupted or compromised by a potential failure of the pull-through system. Instead, the pull-through system is devised to be fixed or replaced by using standard ground support equipment, without delaying the aircraft's turnaround time.

The autonomous, subterranean aircraft pull-through system is an electro-mechanical system that promotes an energy-efficient airport terminal. The system promotes an energy-efficient airport terminal. The autonomous, subterranean aircraft pull-through system's autonomy and sustainability of operation give any airport terminal a clear advantage over the traditional ramp-processing airport terminals of today. The present invention provides significantly faster turnaround times, reducing airport congestion and airport terminal personnel are less fatigued and work within a controlled environment.

The tow bar system can couple with all makes, types, and sizes of commercial aircraft, ensuring no time is lost at the ramp. The autonomous, subterranean aircraft pull-through system provides the most efficient method of handling aircraft as it operates in a linear and unidirectional manner, thus avoiding pushback and associated ramp conflict.

The autonomous, subterranean aircraft pull-through system performs ideally within its multi-level cell construction, allowing the airport terminal to be scaled up or down to suit the aircraft's size and wingspan. The autonomous, subterranean aircraft pull-through system can be constructed with low costs due to the repeatability of the component designs.

Legacy airport terminals tend to be bespoke in their design. The autonomous, subterranean aircraft pull-through system, on the other hand, is a multi-use aircraft pulling system, providing airport operations with a faster, greener, and very efficient way of transiting aircraft at the airport terminal.

With the universally adaptable operating system of the autonomous, subterranean aircraft pull-through system, the aircraft ramp handlers at the airport terminal can be easily trained, resulting in significantly less incidence between the terminal, aircraft, and personnel.

The autonomous, subterranean aircraft pull-through system controls the aircraft movement as the aircraft are transitioned through each of several cells. The control is exercised from the moment the aircraft is coupled with the pull-through system to the time the aircraft is released. The pull-through system also comprises a series of sled assemblies. The sled assemblies are operated as a conveyer rotating along the length of the airport terminal building. As one aircraft completes its transit process, another aircraft enters the airport terminal. As such, the airport terminal operations are continuously fed by the aircraft arriving and departing the airport terminal. Increased efficiency, therefore, can be achieved with the incorporation of robotics and digitalized systems into the handling operations.

The autonomous, subterranean aircraft pull-through system is designed to resolve many systemic challenges associated with the current legacy-based airport terminal handling operations, by combining with a multi-level, integrated airport terminal building, which itself is a development of the legacy airport terminal methodology established over the last 70 years. This innovative dual concept works together with past legacy designs to meet future airport and airline transportation requirements, such as, but not limited to, single aisle, twin aisle, and wide-body aircraft, cargo, SST, UAV, business and general aviation, and military aircraft.

BRIEF DESCRIPTION OF THE SEVERAL VIEWS OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly:

FIG. 7 illustrates a channel support arrangement of an autonomous, subterranean aircraft pull-through system according to various embodiments of the present invention;

Like reference numerals refer to like parts throughout the several views of the drawings.

DETAILED DESCRIPTION OF THE INVENTION

The terminology used herein is for the purpose of describing particular embodiments only. It is not intended to be limiting to the invention. As used herein, the term "and/or" includes any and all combinations of one or more of the associated listed items. The singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and inventions should be read with the understanding that such combinations are entirely within the scope of the invention and the claims of the autonomous, subterranean aircraft pull-through system as discussed herein. In the following description, for purposes of explanation, numerous specific details are set forth in order to provide a thorough understanding of the present invention. It will be evident, however, to one skilled in the art that the present invention may be practiced without these specific details. The present disclosure is to be considered an exemplification of the invention and is not intended to limit the invention to the specific embodiments illustrated by the figures or description below. The present invention will now be described by referencing the appended figures representing preferred embodiments.

Figure 1:
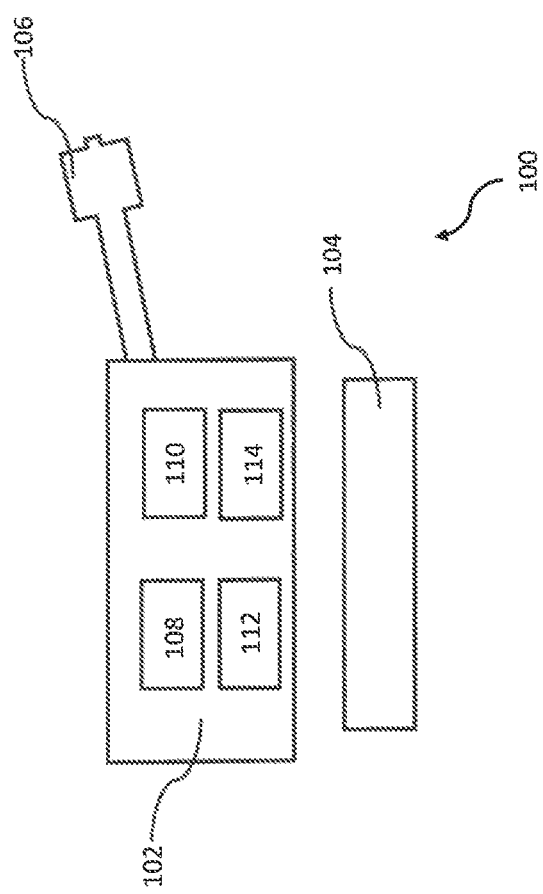
FIG. 1 illustrates a sled system of an autonomous, subterranean aircraft pull-through system according to various embodiments of the present invention.

FIG. 1 illustrates a sled system of an autonomous, subterranean aircraft pull-through system according to various embodiments of the present invention. The sled system 100 includes the sled assembly 102 that includes the power drive system 104, and a tow bar system 106 to provide a pull-through force for all types of aircraft. The sled assembly 102 includes a controller 108, a braking system 110, a positioning sensor 112, and a computer control system 114. The positioning sensor 112 helps to identify the arriving aircraft, select the appropriate tow bar system 106 to hook up, and commence pull-through operations rapidly. The power drive system 104 is robust, scalable, and sustainable in operating schedules that can be 24×7×365. In other embodiments, a storage location for the tow bar system 106 is provided within the sled assembly 102 to avoid sourcing, and coupling delays, given the many tow bar designs needed to service aircraft populations operating today. Since various traditional handling functions may be replaced with the sled assembly 102, it was reasonable to expect those same functions to be retained within the ramp handling domain. So, pulling, aircraft braking, power steering, and cockpit communication would be housed in the sled assembly 102. The tow bar system 106 is installed on the sled assembly 102 which moves on main rails with toothed racks where motion is provided through the engagement of toothed pinion gear wheels and the main rails with toothed racks located on either side of the sled assembly as well as at the front and rear of the sled assembly. The sled assembly 102 includes a decoupling means for decoupling the sled assembly 102 from the aircraft when the aircraft designated for servicing is completed.

Figure 2:
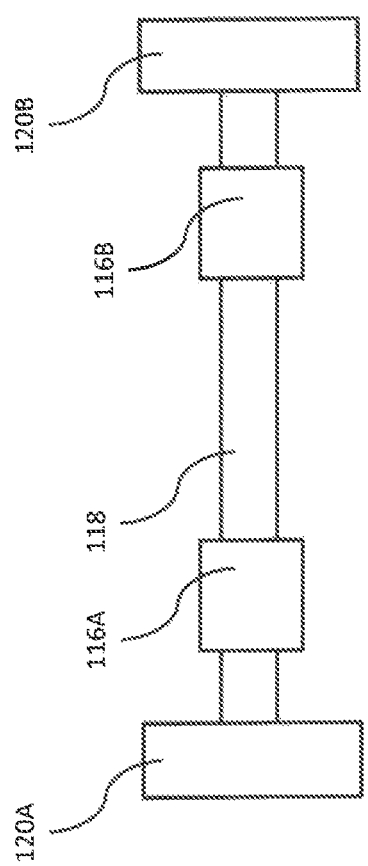
FIG. 2 illustrates the power drive system of FIG. 1 according to various embodiments of the present invention.

FIG. 2 illustrates the power drive system of FIG. 1 according to various embodiments of the present invention. The power drive system 104 gets its energy from an inductive coupling with a wireless connection to the motors. The power drive system 104 includes power drive motors 116A and 116B that turns a power drive shaft 118 connected to pairs of toothed pinion gear wheels 120A and 120B. The toothed pinion gear wheels 120A and 120B are located on each side of the sled assembly 102 as well as at the front and rear of the sled assembly 102. Once power drive is applied to the power drive shaft 118 through the power drive motors 116A and 116B, the power drive shaft 118 turns the pairs of toothed pinion gear wheels 120A and 120B engaging with main rails which are a toothed rack, providing the sled assembly 102 the necessary motive power to pull the aircraft along. The power drive system 104 will be sized to handle the varying sled assembly operating loads.

Figure 3:
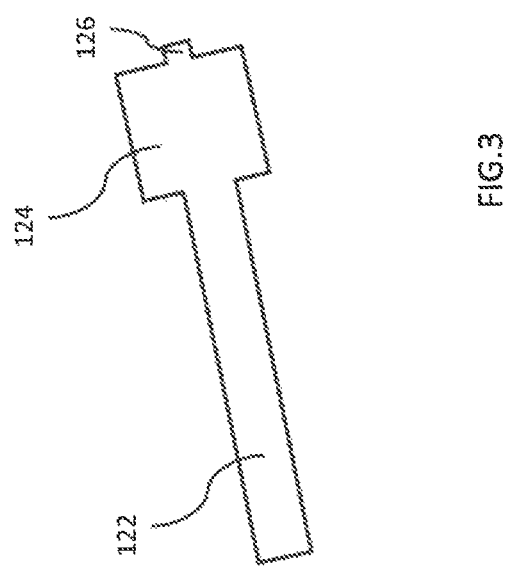
FIG. 3 illustrates the tow bar system of FIG. 1 according to various embodiments of the present invention.
Figure 4:
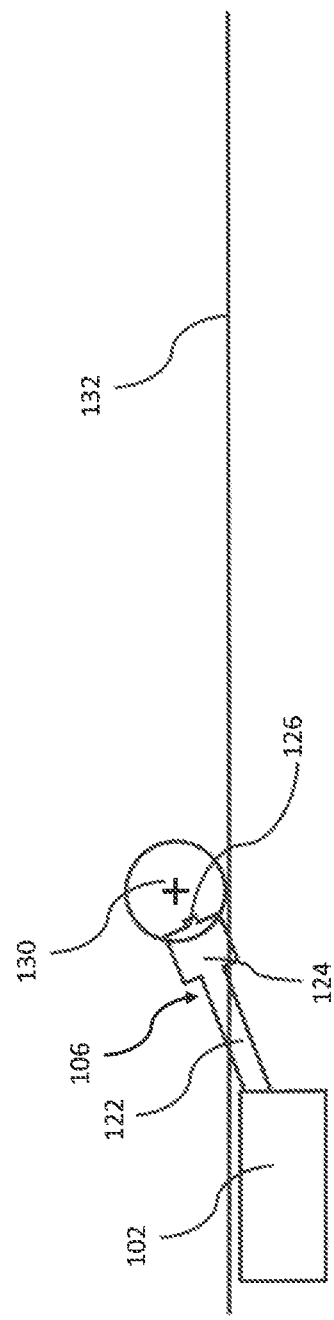
FIG. 4 illustrates the attachment of the tow bar system of FIG. 1 with an aircraft nose wheel according to various embodiments of the present invention.

FIG. 3 illustrates the tow bar system of FIG. 1 according to various embodiments of the present invention. The tow bar system 106 includes a retractable tow bar 122, an adapter 124, and a sensor 126. The retractable tow bar 122 of the tow bar system 106 is anchored to the sled assembly 102 at one end. The other end is designed to incorporate the sensor 126 to engage an aircraft nose wheel 130 (ref. FIG. 4) with an adapter 124. The adapter 124 is structured to connect with various aircraft nose wheel assembly configurations, whereby a coupling device will select the appropriate adapter 124 to connect autonomously with an aircraft.

FIG. 4 illustrates the attachment of the tow bar system of FIG. 1 with an aircraft nose wheel according to various embodiments of the present invention. The sled system 100 including the sled assembly 102, the power drive system 104 is positioned below the ground level 132, and only the adapter end of the towbar system 106 is above the ground level 132. The sensor 126 of the towbar system 106 engages the aircraft nose wheel 130 with an adapter 124. The connection with an aircraft will remain during the servicing process but will uncouple when the aircraft has been cleared for taxiing to the runway. As the aircraft arrive for servicing, the adapter 124 and the sensors 126 help to locate and engage the aircraft nose wheel 130 with an optical device that locates the coupling point on the aircraft nose wheel 130. The optics (image) are programmed into the sled assembly 102 causing the appropriate retractable tow bar 122 and the adapter 124 to be selected and deployed.

Figure 5:
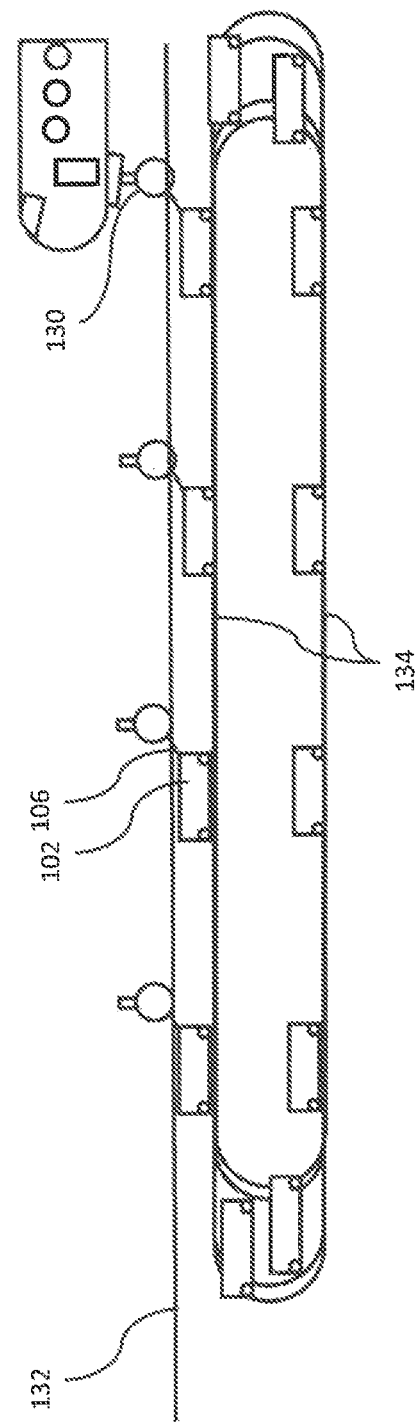
FIG. 5 illustrates the side elevation of the arrangement of an autonomous, subterranean aircraft pull-through system according to various embodiments of the present invention.

FIG. 5 illustrates the side elevation of the arrangement of an autonomous, subterranean aircraft pull-through system according to various embodiments of the present invention. Aircraft arriving at the terminal are met by the sled assembly 102 containing the autonomous tow bar system 106, which connects immediately to the aircraft nose wheel tow fitting. The sled assembly 102, from its subterranean location, pulls aircraft through the vehicle-free ramp in a uni-directional, sequential, simultaneous, and linear movement. Within each row, as the cell servicing is completed, the aircraft move forward together to the next cell. Upon the completion of the transiting process at the airport terminal, the aircraft is met by a ramp taxi, avoiding push back, or power back of the aircraft, associated with the old legacy terminals and their bi-directional flow, causing ramp delays to other surrounding aircraft ready for departure. The power drive system 104 drives the toothed pinion gear wheels 120A-B to provide robust motive power to move the aircraft along main rails 134 with its embedded rack. Each aircraft is assigned a tow bar system 106. Multiple aircraft can be autonomously pulled through at the same time, in rows depending on the turnaround time of the aircraft, with each row operating independently from the other. Accordingly, there is no waiting time for a tow vehicle as found in the old legacy style methods. The tow bar system 106 extends to connect with the aircraft, utilizing one of its many adapters 124, guided to the aircraft nose wheel 130 coupling point by use of the sensor 126. Upon the tow bar system's 106 disconnection from the aircraft, the tow bar system 106 retracts and stows into the sled assembly 102, as it returns to prepare for the pull-through process of the next transiting aircraft.

Figure 6A:
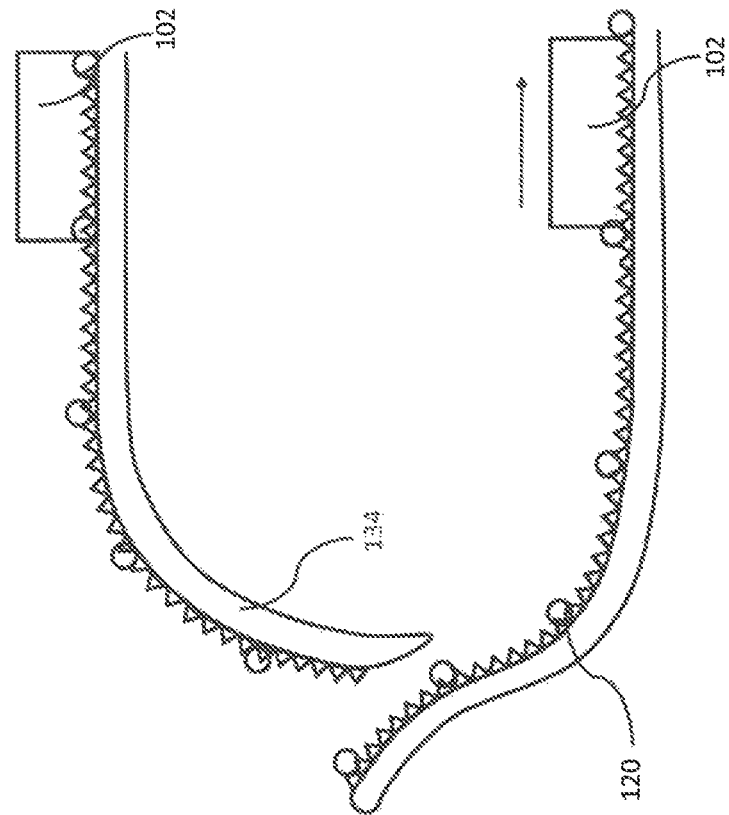
FIGS. 6A-B illustrate toothed rack main rails and toothed pinion gear wheels arrangement of an autonomous, subterranean aircraft pull-through system showing horizontal and vertical switching of toothed pinion gear wheels on the toothed rack main rails according to various embodiments of the present invention.
Figure 6B:
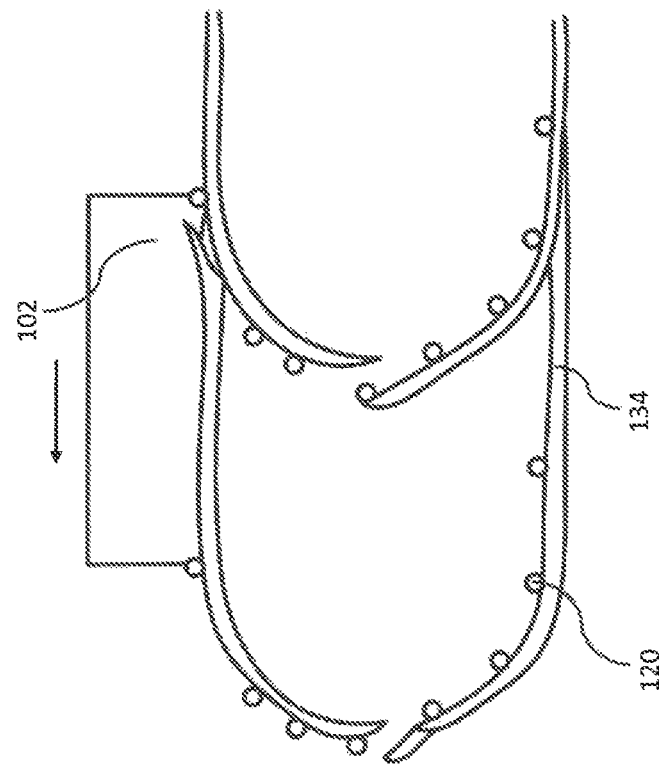

FIGS. 6A-B illustrate toothed rack main rails and toothed pinion gear wheels arrangement of an autonomous, subterranean aircraft pull-through system showing horizontal and vertical switching of toothed pinion gear wheels on the toothed rack main rails according to various embodiments of the present invention. The power of the power drive system 104, including the toothed pinion gear wheels 120A and 120B are combined with rail switching (like train tracks). The sled assembly 102 remains in an upright position during the advancing (aircraft coupling) and returning (aircraft decoupling) cycles. The rail switching arrangement allows the sled assembly 102 to move on the main rails 134 which support it in a "right side up" position, to avoid the customary "upside down" position of a typical conveyor system. In the "advancing" sled assembly 102 horizontal mode in FIG. 6A, the main rails 134 switching stays closed to allow the front set of the toothed pinion gear wheels 120 to stay horizontal. Once the retractable tow bar 122 has been disconnected from the aircraft, the sled assembly's 102 front pinion gear wheels approach a closed switch and pass horizontally. Immediately the switch opens to allow the rear pinion gear wheels to descend around the outer curve of the return loop, at the same time as switching allows the front gear wheels to continue around the outer curve of the main rails 134. Vertical switching rails used to orientate the returning sled assembly 102 mode are open to both front and rear gear wheels on their respective rails, causing a transition from the outside of the curved rails to the inside of the curved rails. The braking system 110 operates on the power drive system 104 to cause a smooth transition of the sled assembly 102 from horizontal, through vertical, and back to horizontal travel.

FIG. 7 illustrates a channel support arrangement of an autonomous, subterranean aircraft pull-through system according to various embodiments of the present invention. The channel arrangement includes upper frame hinge points 140A-B, larger hinged cover plates 156A-B, smaller hinged cover plates 142A-B, lower sub-frame hinge points 144A-B, fixed lower sub-frames 148A-B, a channel structure comprising modules 146, the retractable tow bar 122, the main rails 134, and the toothed pinion gear wheels 120A and 120B. The autonomous, subterranean aircraft pull-through system is provided in a box-shaped channel 146 located below the ground level 132 of the airport terminal building and runs along each row's centerline. The channel structure 146 is provided along the center line of each row of the plurality of cells for the length of the entire airport terminal building. The larger hinged cover plates 156A-B are attached to the upper frame hinge points 140A-B. The larger hinged cover plates 156A-B allow the sled assembly 100 to be removed for repair or replacement. The advancing sled assembly 102 is configured to raise the retractable tow bar 122 by releasing the smaller hinged cover plates 142A-B to facilitate engaging of the towbar system 106 to the aircraft nose wheel 130. The returning sled assembly 102 is configured to stow the retractable tow bar 122. The toothed pinion gear wheels 120A and 120B are attached to the lower sub-frame hinge points 148A-B fastened to the channel structure 146 located on the underside of the airport terminal ground level 132. The movement (advancing and return) of the sled system 100 is achieved through the engaging sets of rotating toothed pinion gear wheels 120A and 120B housed in the sled assembly 102 and the main rails 134.

Figure 8:
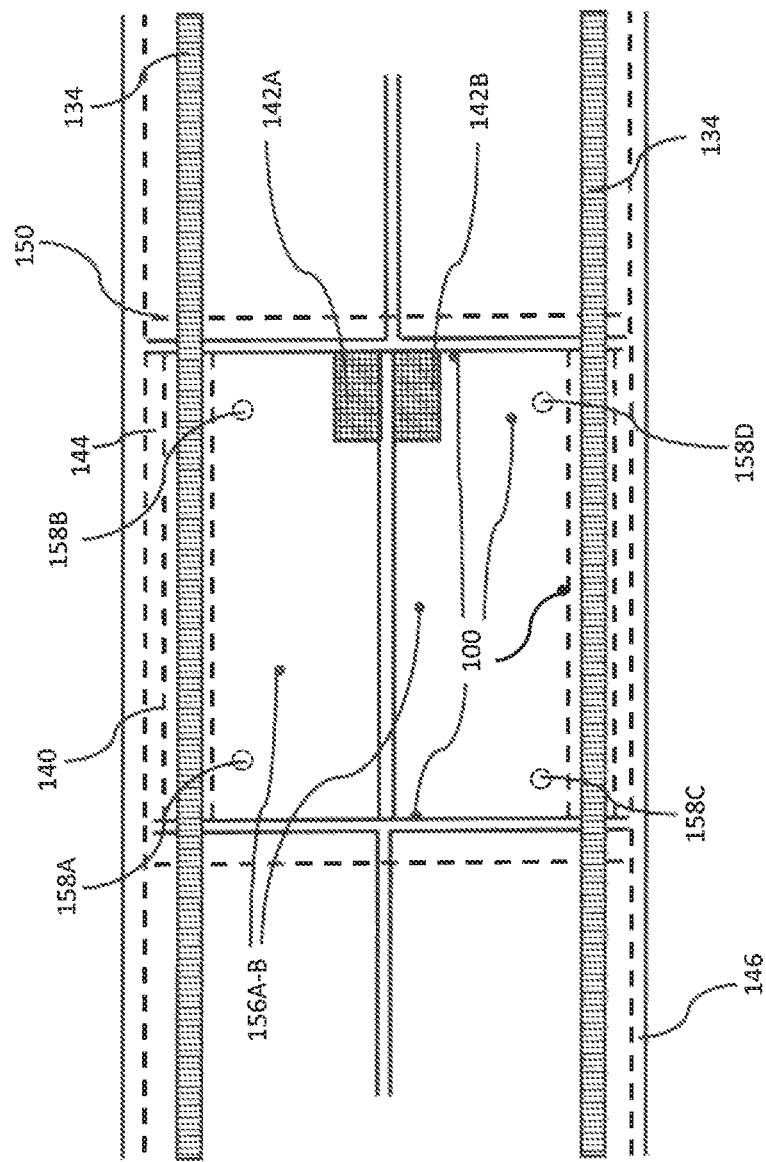
FIG. 8 illustrates a maintenance module of an autonomous, subterranean aircraft pull-through system according to various embodiments of the present invention.

FIG. 8 illustrates a maintenance module of an autonomous, subterranean aircraft pull-through system according to various embodiments of the present invention. The maintenance module includes modules of fixed frames 150 that are equally spaced along the length of the terminal, the hinge line of upper movable frames 140, the hinge line of lower movable frames 144, the larger hinged cover plates 156A-B attached to the hinge line of upper movable frames 140, the larger hinged cover plates 156A-B for access to the sled assembly 102, the main rails 134 with the toothed rack, hook locations 158A-D for the ground vehicle to lift sled assembly 102 including power drive system 104, channel 146 that runs the full length of the airport terminal for each of the plurality of cells within each row. The maintenance module of the autonomous, subterranean aircraft pull-through system comprises all the requisite maintenance and repair capabilities to support the system's continuous operations without any interruptions. The maintenance module ensures that the airport's pulling facility is not interrupted by a failure of the autonomous, subterranean aircraft pull-through system, but instead is designed to allow repair or replacement in situ, or outside its installation, using standard ground support equipment, and without delaying an aircraft turnaround time. The autonomous, subterranean aircraft pull-through system is structured to provide total sustainability of the airport terminal's aircraft handling capability.

Figure 9:
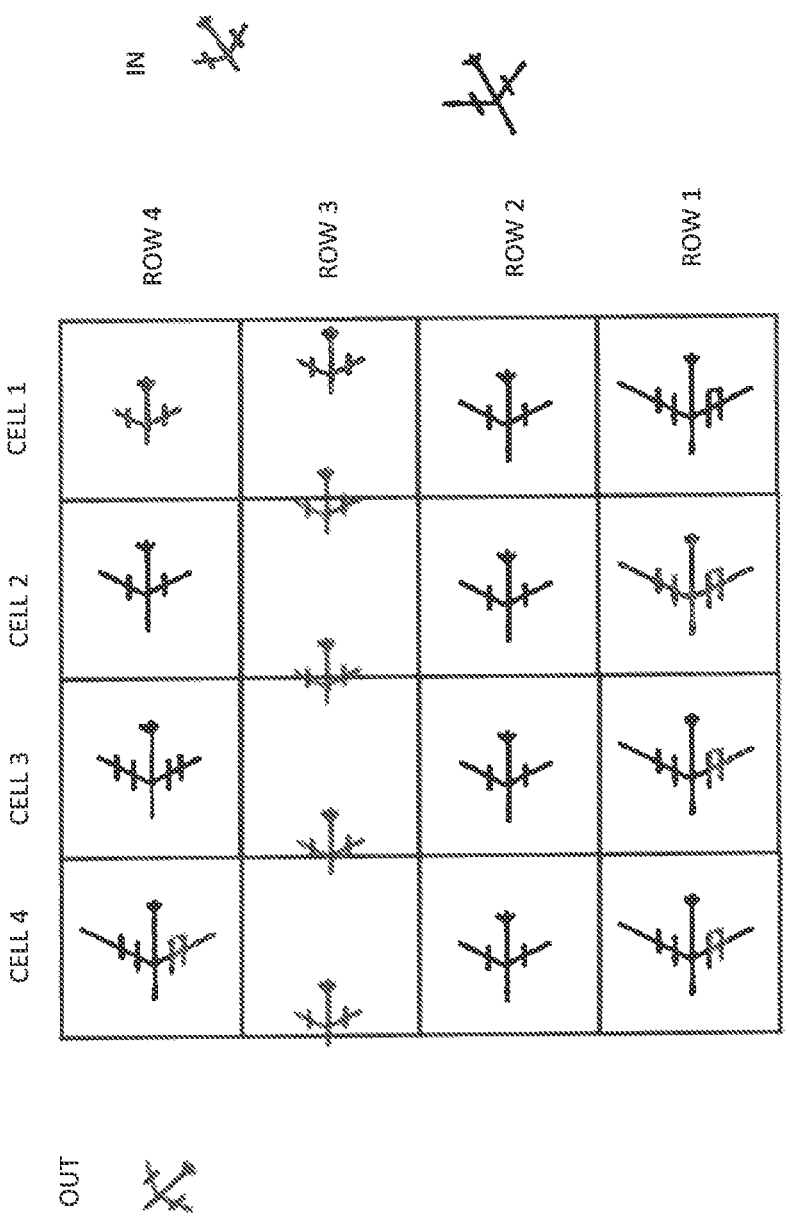
FIG. 9 illustrates cell and row arrangement for pulling aircraft through the terminal building with an autonomous, subterranean aircraft pull-through system according to various embodiments of the present invention.

FIG. 9 illustrates cell and row arrangement for pulling aircraft through the terminal building with an autonomous, subterranean aircraft pull-through system according to various embodiments of the present invention. The speed of motion will be calibrated to match a normal recommended pulling speed, braking speed, and the respective turnaround schedule, for each row of cells. The autonomous, subterranean aircraft pull-through system pulls a transiting aircraft through a sequence of cells, where the aircraft receives a plurality of services in a fully enclosed building. The legacy airport terminal servicing is carried out by as many as twenty vehicles at a single open-air ramp. The autonomous, subterranean aircraft pull-through system is independently programmed to suit aircraft turnaround times for each row of the plurality of cells disposed within the airport terminal, utilizing far fewer vehicles to complete the servicing.

Figure 10:
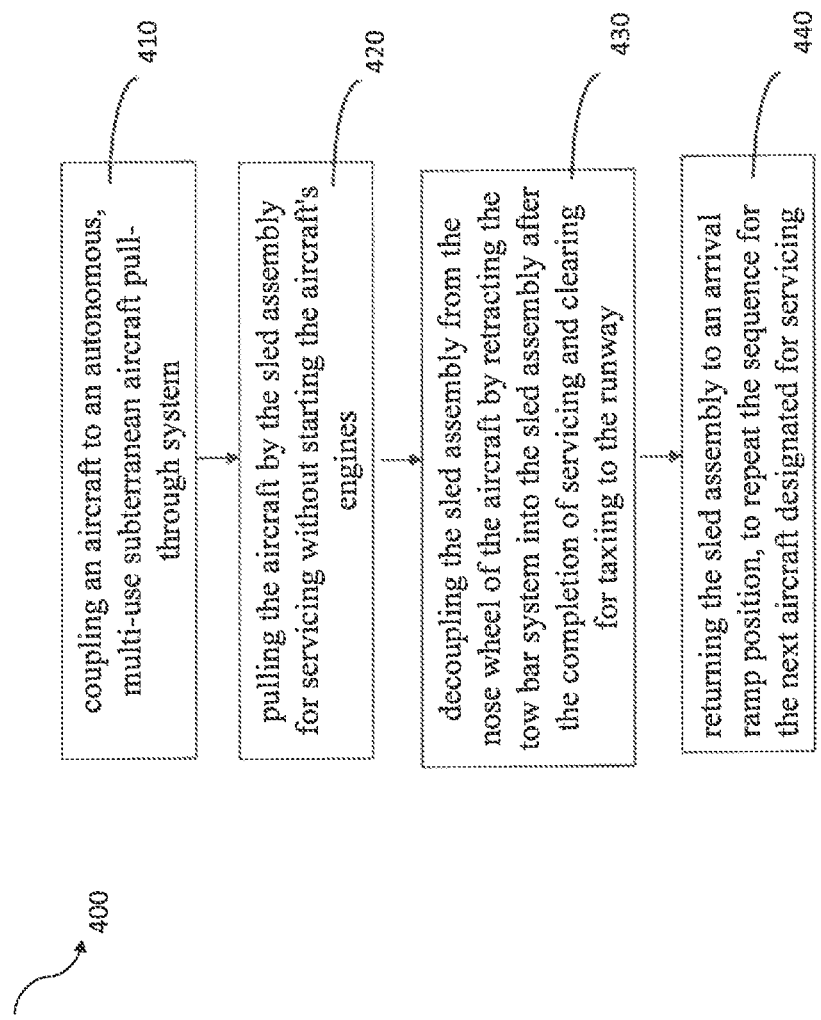
FIG. 10 illustrates a method of facilitating the moving of multiple aircraft at a time through the airport terminal building with an autonomous, subterranean aircraft pull-through system according to various embodiments of the present invention.

FIG. 10 illustrates a method of facilitating the moving of multiple aircraft at a time through the airport terminal building and assisting in servicing the aircraft 400. The method 410 includes coupling an aircraft to an autonomous, multi-use, subterranean aircraft pull-through system. The method 420 includes pulling the aircraft by the sled assembly for servicing without starting the aircraft's engines. The method 430 includes decoupling the sled assembly from the nose wheel of the aircraft by retracting the tow bar system into the sled assembly after the completion of servicing and clearing for taxiing to the runway. The method 440 includes returning the sled assembly to an arrival ramp position, to repeat the sequence for the next aircraft designated for servicing.

In other one of the many other preferred embodiments, a method for pulling aircraft through the airport terminal building with an autonomous, subterranean aircraft pull-through system in accordance with various embodiments of the present invention is also disclosed. At a step 210, the autonomous, subterranean aircraft pull-through system is disposed at the aircraft ramp position to connect with the aircraft to start the sequencing process. At step 220, the tow bar system of the autonomous, subterranean aircraft pull-through system selects a coupling device for the aircraft arrived at the ramp, with engines turned off, and connects to the nose wheel assembly. At a step 230, the autonomous, subterranean aircraft pull-through system engages with the aircraft's braking, steering system, and communication system. At a step 240, the autonomous, subterranean aircraft pull-through system powers up and pulls the aircraft to at least one cell disposed within a row of the airport terminal, and subsequently, stops. Passengers disembark through extended passenger boarding bridges, while bags and cargo are taken off. Passenger boarding bridges (PBB), bags, and cargo handling devices are stowed. At a step 250, sensors signal that it is safe in all the cells and to advance the aircraft (this process is done manually by the airport personnel today). At a step 260, the autonomous, subterranean aircraft pull-through system powers up and pulls the aircraft to the next cell, and subsequently, stops. Boarding bridges are extended to the aircraft. The cleaning crew enters the aircraft using the bridges. After cleaning is completed by the cleaning crew, the PBB's are stowed. At a step 270, sensors signal that it is safe in all the cells and to advance the aircraft. At a step 280, the autonomous, subterranean aircraft pull-through system starts power and pulls aircraft to the next cell. The system then stops. Some PBB's nearest to the aircraft galleys are extended for the ground handlers to load the galley carts delivered by a subterranean system. The aircraft is fueled, by the subterranean system operating autonomously. The ground handling systems are then disconnected, and PBB's are stowed. At a step 290, sensors signal that it is safe in all cells and to advance the aircraft. At a step 300, the autonomous, subterranean aircraft pull-through system starts power, and pulls the aircraft to the next cell. The system then stops. Passenger boarding bridges are extended to the aircraft. The passengers are permitted to embark the aircraft, while the cargo and baggage are loaded autonomously. All connections to the aircraft except ground power and air conditioning are then disconnected, and PBB's stowed. At a step 300, sensors signal that it is safe in all cells to advance the aircraft. At a step 310, the autonomous, subterranean aircraft pull-through system de-couples from the aircraft, allowing the tow bar system to autonomously stow into the sled assembly. Servicing of the aircraft is complete. At a step 315 the tow tug is connected to the aircraft, pulls the aircraft to a stand for engine start up. At a step 320, the autonomous, subterranean aircraft pull-through system moves subterranean on the main rails through a sequence of switches, as it moves back to the arrival ramp position to repeat a similar sequence for the next transiting aircraft designated for its servicing in the row of the plurality of cells. At a step 330, the autonomous, subterranean aircraft pull-through system is configured to repeat the sequences from step 210 to step 320 non-stop, so that aircraft congestion is reduced at the ramp and the aircraft fleet block hours are increased—a measure of airline fleet efficiency.

The autonomous, subterranean aircraft pull-through system is remotely controlled and operates autonomously in a subterranean manner to assist in servicing an aircraft. The system helps to speed up the aircraft handling component of airside operations, improve safety, and reduce emissions, all cost factors borne by both airports and airlines. The autonomous, subterranean aircraft pull-through system does not require digging up airside surfaces. Further, as the motion is uni-directional, there are negligible safety issues, no time delays caused by pull, or pushback operations, and no stress is applied to the nose wheel assembly. Due to the immediate coupling of the sled assembly with the aircraft, the aircraft arrives at servicing as soon as engines are shut down, and so turn time is shortened due to direct coupling and decoupling of aircraft. The present system does not require channels to be cut in apron areas. The aircraft's access to the terminal is uni-directional (i.e.) all aircraft enter the terminal at floor level in the same direction, and transition linearly through the terminal until decoupled from the pull-through system, thus minimizing ramp conflict. The autonomous, subterranean aircraft pull-through system operates within an enclosed terminal where the equipment, motors, drive units, pull bars, aircraft airport staff are protected from the elements. The power drive system is capable of pulling multiple aircraft simultaneously and sequencing them through multiple rows of service cells. This is significant, as major hub airports handle over 1,000 flights per day. The present system facilitates scaling the equipment to suit the mix of aircraft at a given airport, which means equipment can be scaled to handle the appropriate mix of sizes, resulting in cost-effective component and system choices. The present system relies on current auto docking systems to bring the aircraft to the ramp location where the system will couple with an arriving aircraft to bring it immediately into service at the airport terminal. The focus is to reduce handling costs at the airside ramp, rather than in the taxiing process to the ramp. The autonomous, subterranean aircraft pull-through system is designed to handle the fast turnaround times of low-cost carriers around 30 minutes, up to a wide-body aircraft turnaround of about 2 hours, all flowing in the same direction in the airport as necessary. Growth can occur without impacting the usability of valuable apron space.

The pull-through system is entirely subterranean, only an autonomous tow bar is above ground to connect to an aircraft that had docked at a predetermined position on the ramp under an existing auto guidance/docking system connected to the aircraft's braking and steering systems. The pull-through system does not have to travel to the aircraft. The aircraft comes to the pick-up point, saving time, so turnaround time is immediately calculated from hook-up to disconnect of the tow bar system. Each arriving aircraft is programmed to taxi directly to its servicing row, to avoid delay. The pull-through system works autonomously once the coupling of the aircraft takes place, utilizing sensors lining each cell. These sensors trigger the motive power of the system to move serviced aircraft through each cell safely, and simultaneously.

The pull-through system is an integral part of the servicing sequences of the aircraft, moving in a linear motion through the terminal building, in a uni-directional manner, so no pushback action is necessary. Since the aircraft is connected to a subterranean drive system moving in a linear motion, steering is straightforward. So there is little to no risk of collision with ramp vehicles during the entire servicing functions, as they are above ground level. Industry experience has concluded that long distant towing causes extra wear and tear to the nose wheel assembly resulting in more frequent maintenance visits and costs. Since the pull-through system motion is linear, uni-directional, and repeatable for any size of aircraft with a conveyor methodology, the programming for transitioning each aircraft during its servicing functions is simplified compared to multi-directional towing. The pull-though system links up with the aircraft, pulls it into the terminal building, and once serviced the aircraft is disconnected at a ramp area. The pull-through function is provided with a system operating in a complete subterranean manner with necessary control functions and the system further communicates with the aircraft cockpit and braking system. The system's design provides the ability to move multiple aircraft at one time, each with its pull-through system, all moving sequentially, thus increasing the throughput of aircraft over all the legacy airport terminal designs, in the smallest possible footprint. The pull-through system can operate in a fully subterranean manner, to pull an aircraft through an entirely enclosed terminal building utilizing legacy experience, but with a high level of digitization, robotic systems, and computing power to do so.

All transitioning of the aircraft, from hook up through servicing to disconnect, is linear within adjacent rows of multiple service cells, so that aircraft move side by side and nose to tail inside the terminal building. The motive force selected to tow the aircraft comes from a rack and pinion system, which has demonstrated strong reliability with trains (cog railways) and automotive vehicles (steering systems), so is anticipated to provide a sustainable system, operating around the clock. The autonomous, subterranean aircraft pull-through system can service the aircraft from both port and starboard at multiple levels, with passengers guided by touchless screens to zone seating, to speed enplaning and deplaning. The autonomous, subterranean aircraft pull-through system operates under a full roof covering the terminal, to protect aircraft, passengers, and equipment from the weather, adding to the efficiency of the terminal building. The present system outlines the terminal footprint with rows and cells that are scalable thus accommodating various aircraft wingspans side by side, and for the repurposing of the building should it be necessary.

The autonomous, subterranean aircraft pull-through system engages with the aircraft once the aircraft's engines are turned off outside the airport terminal building. The system uses its motive power to move the aircraft forward into the environment of the airport terminal. The autonomous, subterranean aircraft pull-through system operates within more than one row of the airport terminal, with multiple autonomous, subterranean aircraft pull-through systems acting upon multiple aircraft simultaneously, ensuring turnaround times repeatedly. The autonomous, subterranean aircraft pull-through system can operate within each row of the plurality of cells of the airport terminal. The pull-through system operates with the aircraft depending on the turnaround times stipulated by the airlines' schedule. Since each row is operated independently from the other, the rows can be differentiated by the aircraft turnaround times. The autonomous, subterranean aircraft pull-through system guides the aircraft, as it transitions through each row of the airport terminal. The pull-through system has a robust motive power system with a built-in capacity for a full range of aircraft. The pull-through system can be positioned within each cell of each row of the airport terminal building. The pull-through system has its location determined based on the airport's configuration, which is typically addressed by the frequency of the transiting aircraft. Based on the airport configurations, the layout, and the number of pull-through systems can be defined during the airport terminal authority's planning stage.

The autonomous, subterranean aircraft pull-through system is designed to work in conjunction with the Integrated Multi-Level Airport Terminal System and Method covered in U.S. Pat. No. 10,544,599 B2 together with U.S. Pat. No. 11,117,679 B2 to supply the motive force to pull aircraft from the ramp area into an enclosed terminal building where they are serviced and released. While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this invention.

What is claimed is:

1. An autonomous, multi-use, subterranean aircraft pull-through system for moving and servicing multiple aircraft simultaneously through an airport terminal building comprising:
   a sled system comprising a sled assembly to provide a pulling force for the aircraft in a uni-directional, simultaneous, and linear movement;
   wherein the sled assembly moves linearly during servicing of the aircraft, then cycles through a channel arrangement disposed below the ground floor of the airport terminal building in an endless loop to reconnect with the next aircraft arriving at a desired location for servicing;
   a tow bar system anchored to the sled assembly at a first end, a second end of the sled assembly includes a plurality of adapters;
   wherein the tow bar system extends to connect with the aircraft, utilizing at least one of the plurality of adapters, guided to the aircraft nose wheel coupling point of the aircraft by using a sensor;
   wherein the sled assembly further comprising a power drive system, a controller, a braking system, a plurality of positioning sensors, and a computer control system;
   wherein the sled assembly is steerable by the power drive system, the sled assembly is accelerated by the power drive system under the control of the controller and stopped by the braking system;
   wherein the computer control system is configured to communicate with the sled assembly;
   wherein the positioning sensors are configured to identify the arriving aircraft and select the appropriate adapter to attach to the aircraft for commencing the pull through operations; and wherein the sled assembly further comprising a decoupling means for decoupling the sled assembly from the aircraft being pulled, when the aircraft designated for servicing is completed.

2. The autonomous, multi-use, subterranean aircraft pull-through system as claimed in claim 1, wherein the sled assembly is configured to pull the aircraft through multiple cells arranged in a row, wherein the servicing of the aircraft takes place in preparation for the aircraft's departure.

3. The autonomous, multi-use, subterranean aircraft pull-through system as claimed in claim 1, wherein the sled assembly moves on main rails with toothed racks in a sled motion provided through the engagement of toothed pinion gear wheels located at the front and rear of the sled assembly with the rails located on either side of the sled assembly.

4. The autonomous, multi-use, subterranean aircraft pull-through system as claimed in claim 3, wherein a rail switching arrangement allows the sled assembly to move on the main rails in an upright position during aircraft coupling and aircraft decoupling cycles, wherein horizontal and vertical switching of the toothed pinion gear wheels on the toothed rack main rails allows the sled assembly to maintain the upright position.

5. The autonomous, multi-use, subterranean aircraft pull-through system as claimed in claim 1, wherein the channel arrangement comprises (i) a channel structure for the length of the airport terminal building, (ii) fixed frames modules equally spaced along the length of the airport terminal building, (iii) lower hinged sub frames fastened to the channel structure located on the underside of the airport terminal ground level engaging the sets of rotating toothed pinion gear wheels and the main rails, (v) movable upper and lower frames comprising hinge points, and (vi) larger hinged cover plates and smaller hinged cover plates, wherein the larger hinged cover plates are attached to the movable upper frame hinge points.

6. The autonomous, multi-use, subterranean aircraft pull-through system as claimed in claim 5, wherein an advancing sled assembly is configured to raise the tow bar system by releasing the smaller hinged cover plates to facilitate the engagement of the adapter to the aircraft nose wheel.

7. The autonomous, multi-use, subterranean aircraft pull-through system as claimed in claim 1, wherein the system further comprises a remote controlling means that coordinates the pull through sequences of the aircraft in real-time with ground control, air traffic control, support services, and ground staff using a wireless communication link at a distinct frequency.

8. An autonomous, multi-use, subterranean aircraft pull-through system for moving and servicing multiple aircraft simultaneously through an airport terminal building comprising:
a sled system comprising a sled assembly structured to provide a pulling force for the aircraft in a uni-directional, simultaneous and linear movement through the multiple cells of the airport terminal building arranged in a row;
wherein the sled assembly moved linearly during the servicing of an aircraft, then cycles through a channel arrangement located below the ground floor of the airport terminal building in an endless loop to reconnect to the next aircraft to arrive at the airport terminal entrance;
a tow bar system anchored to the sled assembly at a first end, a second end is structured to incorporate a plurality of adapters;
wherein the tow bar system extends to connect with the aircraft, utilizing at least one of its plurality of adapters, guided to the aircraft nose wheel coupling point of the aircraft by use of a sensor;
wherein the sled assembly further comprising a power drive system, a controller, a braking system, a plurality of positioning sensors, and a computer control system;
wherein the sled assembly is steerable by the power drive system, the sled assembly is accelerated by the power drive system under the control of the controller and stopped by the braking system;
wherein the computer control system is configured to (i) control acceleration and stopping of the sled assembly, (ii) automate coupling and decoupling of the aircraft nose wheel with the tow bar system, (iii) indicate when the sled assembly starts and stops, and (iv) engages with the aircraft's braking system throughout the process of transitioning the multiple cells;
wherein, after the sled assembly is accelerated so as to cause movement of the sled assembly and concomitant movement of the aircraft being pulled, the steering of the sled assembly is under the control of the computer control system;
wherein the positioning sensors are configured to identify the arriving aircraft and select the appropriate adapter to attach to the aircraft for commencing the pull through operations, wherein the computer control system communicates with the positioning sensors in each row of cells;
wherein the sled assembly further includes a decoupling means for decoupling the sled assembly from the aircraft being pulled, when the aircraft designated for servicing in the cell is completed; and
wherein the sled system travels subterranean on main rails through a sequence of switches, as it travels back to the arrival ramp position, to repeat the sequence for the next aircraft designated for servicing in the particular row of cells.

9. The autonomous, multi-use, subterranean aircraft pull-through system as claimed in claim 8, wherein the sled assembly moves on the main rails provided with the toothed racks, where motion of the sled assembly is provided through the engagement of toothed pinion gear wheels at the front and rear of the sled assembly and the main rails with toothed racks located on either side of the sled assembly.

10. The s autonomous, multi-use, subterranean aircraft pull-through system as claimed in claim 9, wherein a rail switching arrangement allows the sled assembly to move on the main rails in an upright position during aircraft coupling and aircraft decoupling cycles, wherein horizontal and vertical switching of the toothed pinion gear wheels on the toothed rack main rails allows the sled assembly to maintain the upright position.

11. The autonomous, multi-use, subterranean aircraft pull-through system as claimed in claim 8, wherein the power drive system comprises power drive motors and a power drive shaft connected to the main rails with toothed racks and toothed pinion gear wheels, wherein the power drive system drives the power drive shaft through the power drive motors that turn the toothed pinion gear wheels engaging with toothed rack main rails, providing the sled assembly the necessary motive power to pull the aircraft along.

12. The autonomous, multi-use, subterranean aircraft pull-through system as claimed in claim 8, wherein the adapters and the sensor facilitate locating and engaging the aircraft nose wheel with an optical device that locates the coupling point on the aircraft nose wheel.

13. The autonomous, multi-use, subterranean aircraft pull-through system as claimed in claim 8, wherein each aircraft is assigned a sled assembly comprising the tow bar system that extends to connect with the aircraft with the plurality of adapters and retracts to stow into the sled assembly upon disconnection from the aircraft.

14. The s autonomous, multi-use, subterranean aircraft pull-through system as claimed in claim 8, wherein the power drive system is positioned below the ground level.

15. The autonomous, multi-use, subterranean aircraft pull-through system as claimed in claim 8, wherein the channel arrangement further comprises (i) a channel structure provided along the center line of each row of the plurality of cells for the length of the entire airport terminal building, (ii) fixed frames modules equally spaced along the length of the terminal, (iii) lower hinged sub frames fastened to the channel structure located on the underside of the airport terminal building ground level engaging the sets of rotating toothed pinion gear wheels and the main rails housed in the sled assembly, (v) movable upper and lower frames comprising a plurality of hinge points, (vi) smaller hinged cover plates, and (vii) larger hinged cover plates, wherein the larger hinged cover plates are attached to the movable upper frames.

16. The autonomous, multi-use, subterranean aircraft pull-through system as claimed in claim 15, wherein the larger hinged cover plates open to allow the sled assembly to be removed from the ground level of the airport terminal building for repair or replacement.

17. The autonomous, multi-use, subterranean aircraft pull-through system as claimed in claim 15, wherein an advancing sled system is configured to raise the tow bar system by releasing the smaller hinged cover plates to facilitate the engagement of the adapter to the aircraft nose wheel.

18. The autonomous, multi-use, subterranean aircraft pull-through system as claimed in claim 8, wherein the sled assembly pulls the aircraft through a row of cells, with the aircraft positioned nose to tail, and side by side within the enclosed terminal.

19. The autonomous, multi-use, subterranean aircraft pull-through system as claimed in claim 8, wherein the system further comprises a remote controlling means that coordinates the pull through sequences of the aircraft in real-time with ground control, air traffic control, support services, and ground staff using a wireless communication link at a distinct frequency.

20. A method of facilitating the moving of multiple aircraft at a time through the airport terminal building and assisting in servicing the aircraft, wherein the method comprises the steps of:

(a) coupling an aircraft to an autonomous, multi-use, subterranean aircraft pull-through system comprising:
 a sled system comprising a sled assembly to provide a pulling force for the aircraft in a uni-directional, simultaneous and linear movement
 wherein the sled assembly travels linearly during servicing of the aircraft, then cycles through a channel arrangement located below the ground floor of the airport terminal building in an endless loop to reconnect to the next aircraft to arrive at a desired location for servicing;
 a tow bar system anchored to the sled assembly at a first end, a second end is structured to incorporate a plurality of adapters;
 wherein the tow bar system extends to connect with the aircraft, utilizing at least one of its plurality of adapters, guided to the aircraft nose wheel coupling point of the aircraft by use of a sensor;
 wherein the sled assembly comprises a power drive system, a controller, a braking system, a plurality of positioning sensors, and a computer control system;
 wherein the sled assembly further comprising a power drive system, a controller, a braking system, a plurality of positioning sensors, and a computer control system;
 wherein the sled assembly is steerable by the power drive system, the sled assembly is accelerated by the power drive system under the control of the controller and stopped by the braking system;
 wherein the computer control system is configured to communicate with the sled assembly;
 wherein the positioning sensors are configured to identify the arriving aircraft and select the appropriate adapter to attach to the aircraft for commencing the pull through operations; and
 wherein the sled assembly further comprising a decoupling means for decoupling the sled assembly from the aircraft being pulled, when the aircraft designated for servicing is completed;
(b) pulling the aircraft by the sled assembly for servicing without starting the aircraft's engines;
(c) decoupling the sled assembly from the nose wheel of the aircraft by retracting the tow bar system into the sled assembly after completion of servicing and clearing for taxiing to the runway; and
(d) returning the sled assembly to an arrival ramp position, to repeat the sequence for the next aircraft designated for servicing;
 wherein the use of the sled system reduces congestion of the aircraft at the ramp, and increases aircraft block hours, a measure of airline fleet efficiency.

* * * * *